US00RE36638E

United States Patent [19]

Herman

[11] E Patent Number: Re. 36,638

[45] Reissued Date of Patent: Apr. 4, 2000

[54] MULTIPLE CONFIGURATION PRODUCE STAND

[76] Inventor: Richard J. Herman, 2809 Hampton Way, Hendersonville, N.C. 28791

[21] Appl. No.: 09/227,038

[22] Filed: Jan. 7, 1999

Related U.S. Patent Documents

Reissue of:

[64] Patent No.: 5,590,796
Issued: Jan. 7, 1997
Appl. No.: 08/373,550
Filed: Jan. 17, 1995

[51] Int. Cl.[7] ..... A47F 5/00

[52] U.S. Cl. ..... 211/149; 211/150; 108/99

[58] Field of Search ..... 211/149, 132, 211/195, 130, 208, 150, 36, 38; 108/32, 99, 100

[56] References Cited

U.S. PATENT DOCUMENTS

| | | | |
|---|---|---|---|
| 485,627 | 11/1892 | Hamblin | 108/100 |
| 735,346 | 8/1903 | Dean . | |
| 1,035,552 | 8/1912 | Doering . | |
| 1,067,816 | 7/1913 | Jersemann . | |
| 1,283,326 | 10/1918 | Schreck . | |
| 1,409,856 | 3/1922 | Hill . | |
| 1,827,776 | 10/1931 | Betts . | |
| 1,896,604 | 2/1933 | Bales | 108/100 |
| 1,944,649 | 1/1934 | Smith | 211/150 X |
| 2,119,442 | 5/1938 | Robinson . | |
| 2,210,350 | 8/1940 | Van Delle | 211/149 X |
| 2,483,263 | 9/1949 | Cummings | 211/130 |
| 2,558,465 | 6/1951 | Seymour | 108/100 X |
| 2,598,983 | 6/1952 | Ellis . | |
| 2,883,064 | 4/1959 | McKenzie . | |
| 3,141,424 | 7/1964 | Seymour | 108/99 X |
| 3,256,037 | 6/1966 | Giambalvo | 108/99 X |
| 3,385,453 | 5/1968 | Dantino et al. . | |
| 3,625,160 | 12/1971 | Bergman . | |
| 3,712,521 | 1/1973 | Tanner | 211/150 X |
| 3,872,800 | 3/1975 | Wallis et al. . | |
| 4,108,154 | 8/1978 | Nelson . | |
| 4,295,623 | 10/1981 | Schweizer . | |
| 4,913,501 | 4/1990 | Swank . | |
| 5,344,033 | 9/1994 | Herman . | |
| 5,590,796 | 1/1997 | Herman . | |

*Primary Examiner*—Robert W. Gibson, Jr.
*Attorney, Agent, or Firm*—Carter & Schneider, P.A.

[57] ABSTRACT

An improved stand for displaying merchandise is provided in a rack for displaying merchandise comprising; a bottom frame comprising; a front member; a pair of side members; a display frame pivotally attached to the bottom frame wherein the display frame comprises; side legs; two parallel shelf arms pivotally attached to the side legs; at least one cross-member attached to each shelf arm such that the shelf arms remain parallel; at least one swing support attached to the shelf arm and the side legs; at least one adjustable support rotatably mounted to the bottom frame and rigidly attached to the display frame wherein the adjustable support comprises; a tube; an elongated member slidably mounted to the tube; a locking element for reversibly fixing the position of the elongated member relative to the tube.

18 Claims, 6 Drawing Sheets

MULTIPLE CONFIGURATION PRODUCE STAND

Matter enclosed in heavy brackets [ ] appears in the original patent but forms no part of this reissue specification; matter printed in italics indicates the additions made by reissue.

BACKGROUND OF THE INVENTION

This invention relates generally to an adjustable display rack for foodstuffs and the like. More specifically this invention relates to a display rack in which a variety of configurations can be employed without jeopardizing the stability or strength of the rack.

The manner in which a product is displayed is a major factor in a consumers selection process. This places a particular burden on a retailer since the appearance must be visually appealing. Grocery retailers face a particular burden since the produce displayed varies by season and the amount of produce varies throughout the business day. There has been a long felt need in the art to provide a display table which can be altered easily.

Safety is also a major concern for any business and a retailer must always insure that display racks will not collapse or change positions inadvertently. The necessity for visual appeal and safety are frequently contradictory.

Display racks are available which meet the needs of safety as exemplified in U.S. Pat. No. 5,344,033, for example. Display racks of this type comprise a bin which can only be altered on one axis. This deficiency limits; the applicability to only those items which can be displayed on a flat rack, or to items which can be displayed on an incline. Merchandise must be placed in the bin and as the bin is tilted upward the merchandise has a tendency to slide towards the bottom of the incline. As the bin is tilted upward the merchandise at the top of the bin rest on the merchandise at the bottom of the bin which often causes damage. This is particularly undesirable for soft merchandise such as tomatoes, oranges and similar produce. Furthermore, the display racks of the prior art may only be adjusted in one parameter and there is no opportunity to alter the manner in which the items are, displayed except for the degree of incline. There is a need for a display rack which can comprise parallel shelves such that items may be displayed on the parallel shelves.

Display shelves with parallel shelves are available as exemplified in U.S. Pat. Nos. 2,883,064; 1,035,552; 1,827,776; 2,119,442 and 2,598,983. None of these display shelves provide for the advantage of also offering a slanted bin which can be adjusted as the level of merchandise changes. Also the spacing between shelves is either fixed by the manufacturer or the shelves must be removed and reinserted in a different location to obtain a different spacing between shelves.

To date no single display rack is known to exist which can display items on a inclined bin with a variable angle as well as provide a manner for displaying items on adjustable parallel shelves and still provide the stability necessary. There has been a long felt need in the art for a display rack which can assume a variety of configurations as provided herein.

SUMMARY OF THE INVENTION

It is an object of the present invention to provide a display stand which can serve a multitude of purposes.

It is another object of the present invention to provide a display stand which can display items on a shelf, a slanted bin or either.

A particular feature of the present invention is the stability owing to the design.

These and other features will be apparent from the description. Provided herein is a rack for displaying merchandise comprising; a bottom frame comprising; a front member; a pair of side members; a display frame pivotally attached to said bottom frame wherein said display frame comprises; side legs; two parallel shelf arms pivotally attached to said side legs; at least one cross-member attached to each said shelf arm such that said shelf arms remain parallel; at least one swing support attached to said shelf arm and said side legs; at least one adjustable support rotatably mounted to said bottom frame and rigidly attached to said display frame wherein said adjustable support comprises; a tube; an elongated member slidably mounted to said tube; a locking element for reversibly fixing the position of said elongated member relative to said tube.

A particularly preferred embodiment is provided in A rack for displaying merchandise comprising; a bottom frame comprising; a front member; a pair of side members; a display frame pivotally attached to said bottom frame wherein said display frame comprises: side legs; two shelf arms pivotally attached to said side legs; at least one cross-member attached to each said shelf arm such that said shelf arms remain parallel; at least one discretely variable swing support attached to said shelf arm and said side legs; at least one discretely adjustable support rotatably mounted to said bottom frame and rigidly attached to said display frame wherein said adjustable support comprises; a tube comprising an alignment hole; an elongated member slidably mounted to said tube wherein said elongated member comprises a multiplicity of alignment holes; a locking element for reversibly engaging with one said adjustment hole of said elongated member and said alignment hole of said tube.

Yet another particularly preferred embodiment is provided in A rack for displaying merchandise comprising; a bottom frame comprising; a front member; a pair of side members; a display frame pivotally attached to said bottom frame wherein sad display frame comprises: side legs; two shelf arms pivotally attached to said side legs; at least one cross-member attached to each said shelf arm such that said shelf arms remain parallel; at least one continuously variable swing support attached to said shelf arm and said side legs; at least one adjustable support rotatably mounted to said bottom frame and rigidly attached to said display frame wherein said adjustable support comprises; a tube; an elongated member slidably mounted to said tube; a locking element for reversibly fixing the position of said elongated member relative to said tube.

DETAILED DESCRIPTION OF THE INVENTION

Throughout the following description similar elements are numbered accordingly.

Figure 1:
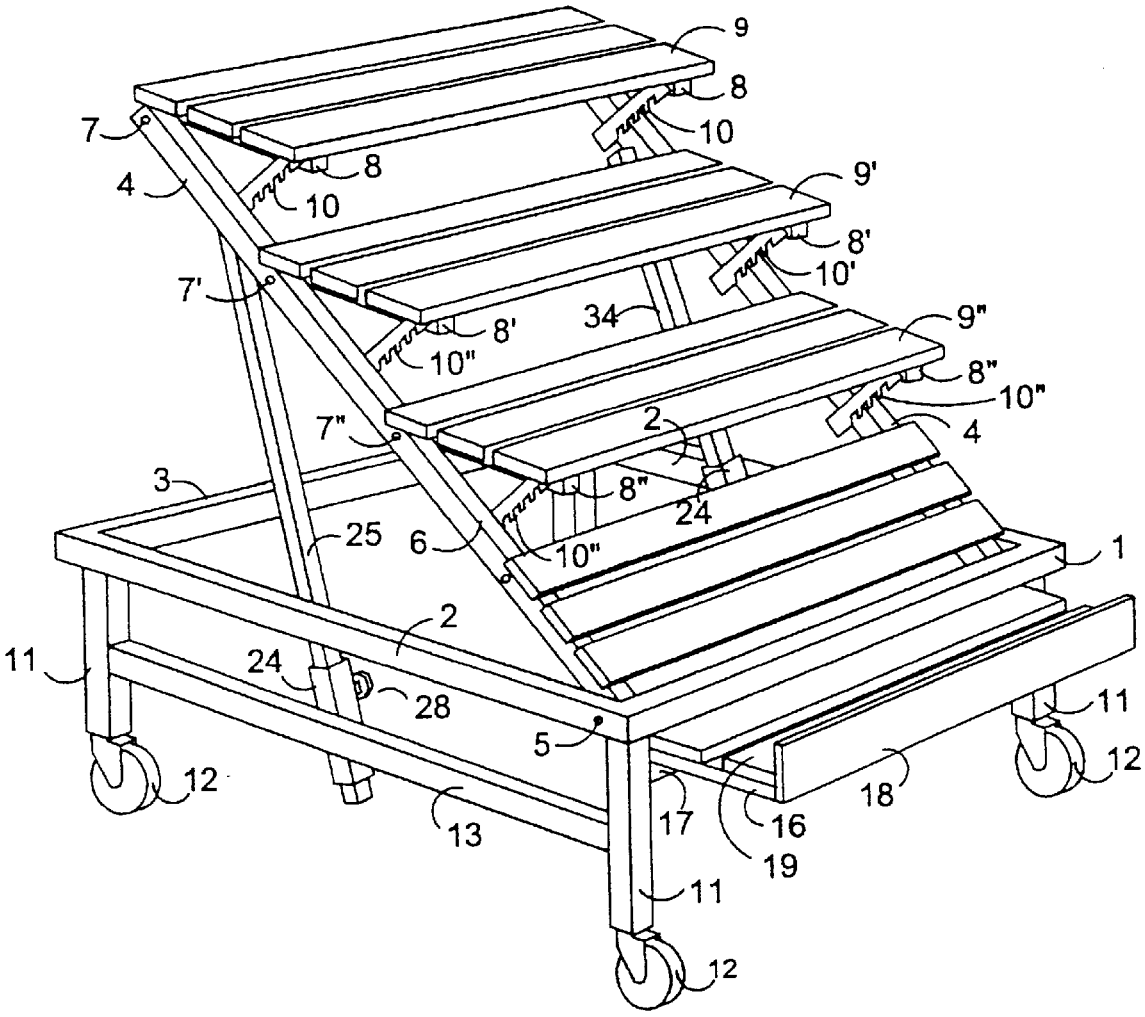
FIG. 1 shows a display rack of the present invention with discretely variable positioning.

FIG. 1 shows a display rack of the present invention with discretely variable positioning. In FIG. 1, a bottom frame is defined by a front member, 1, a pair of side members, 2, and a rear member, 3. Pivotally attached to the side member, 2, of the bottom frame is a display frame suitable for displaying merchandise. The display frame is defined by a pair of side legs, 4, which are independently attached to the side members, 2, by a pair of axles, 5. The display frame can pivot between two extremes. In one extreme the side legs, 4, can be substantially parallel to the bottom frame such that the upper surface, 6, of the side legs are co-planar with the upper surface of the side members, 2. The side legs, 4, are preferably between the side members, 2, when the bottom frame is all the way down as defined when the upper surface of the side legs, 6, and the side members are co-planar. In the other extreme the side legs, 4, can be substantially perpendicular to the side member, 2. Pivotally attached to the side legs, 4, by a shelf pivot, 7, is at least one shelf with each shelf comprising a pair of parallel shelf arms, 8, and at least one shelf cross-member, 9, perpendicular to and rigidly attached to the matching parallel shelf arms. A discretely variable swing support, 10, is attached between the outer extent of the shelf arm, 8, and the side legs, 4. The discretely variable swing supports, 10, are attached such that the pair of shelf arms, 8, may pivot in any position between two extreme positions. One position is parallel to the side legs, 4, and the other extreme position is perpendicular to the side legs. The discretely variable swing supports, 10, allow the angle between the shelf and the side legs, 4, to be maintained at discrete intervals between the extreme positions as will be apparent. Extending downward from the bottom frame are legs, 11, with optional, and preferred wheels, 12. An optional, but preferred brace, 13, spans between the legs for strength. Slidably attached to the front of the bottom frame is an optional extension. The extension comprises a pair of slides, one of which is shown at 16, which slide on a slide block, 17. When the extension is slid inward the front face, 18, contacts the front member, 1. At least one slat 19, is attached to the upper surface of the slides to form a floor for the extension. A tube, 24, is attached to the bottom frame at either the side member, 2, or the brace, 13. The tube receives a discrete sliding member, 25, which is attached to the rearward portion of the side legs, 4. The discrete sliding member, 25, slides within the tube, 24, as the display frame tilts. The discrete sliding member, 25, tube, 24 and pin, 28, work in concert to fix the position of the side legs at a selected position between the two extreme positions as will be apparent from the details below.

Figure 2:
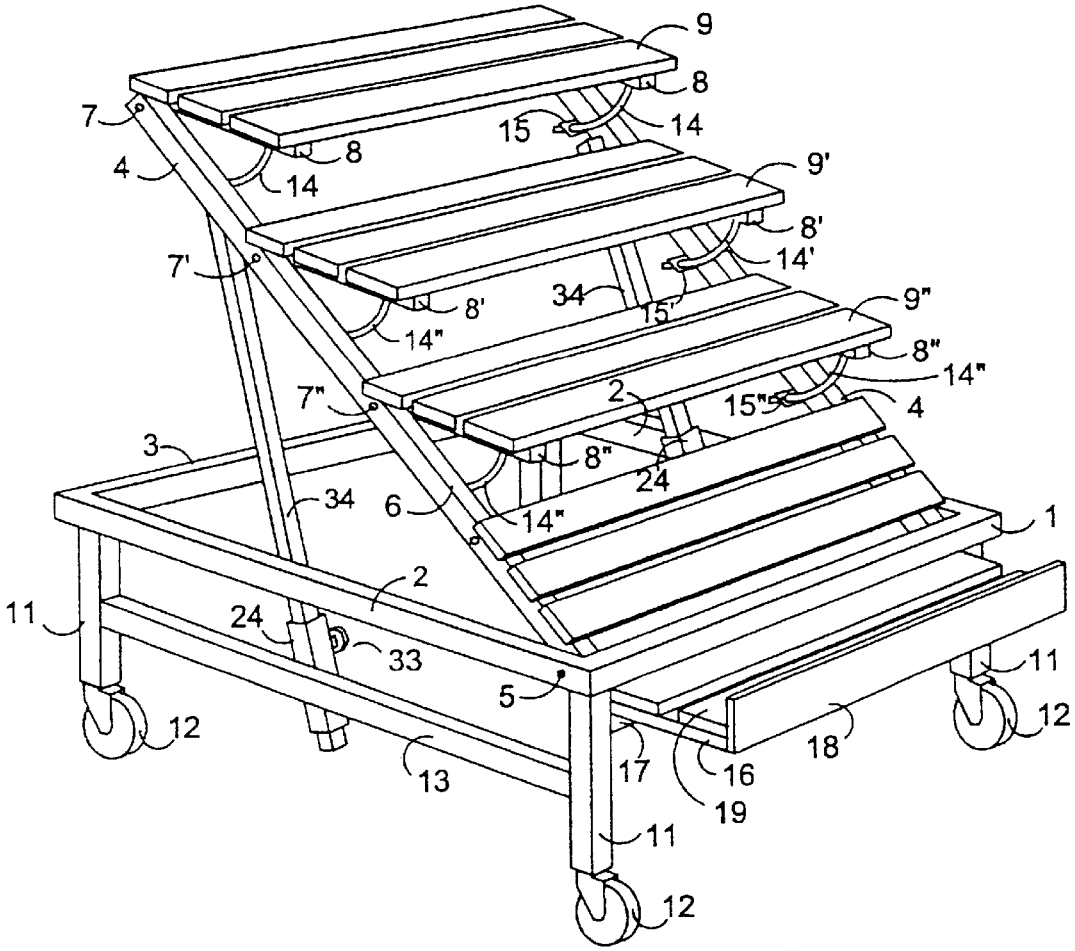
FIG. 2 shows a display rack of the present invention with continuously variable positioning.

FIG. 2 shows a display rack of the present invention comprising continuously variable positioning. In FIG. 2 the front member, 1, side member, 2, rear member, 3, side legs, 4, axle, 5, shelf pivot, 7, shelf arms, 8, shelf cross-member, 9, legs, 11, wheels, 12, brace, 13, slide, 16, slide block, 17, front face, 18, slat, 19, and tube, 24, are similar to those elements described in FIG. 1. Attached to the rearward portion of the side legs, 4, is a continuously adjustable slide member, 34. The continuously adjustable slide member, 34, and threaded pin, 33, will be described in more detail. A continuously variable swing arm, 14, connects to a tension bracket, 15, which is attached to the outer extent of the shelf arm, 8, and side legs, 4. The continuously adjustable slide member, 34, in combination with the continuously variable swing arm, 14, allows the orientation of the shelves to be at any angle or separation within the physical limits which are apparent from the description.

Figure 3:
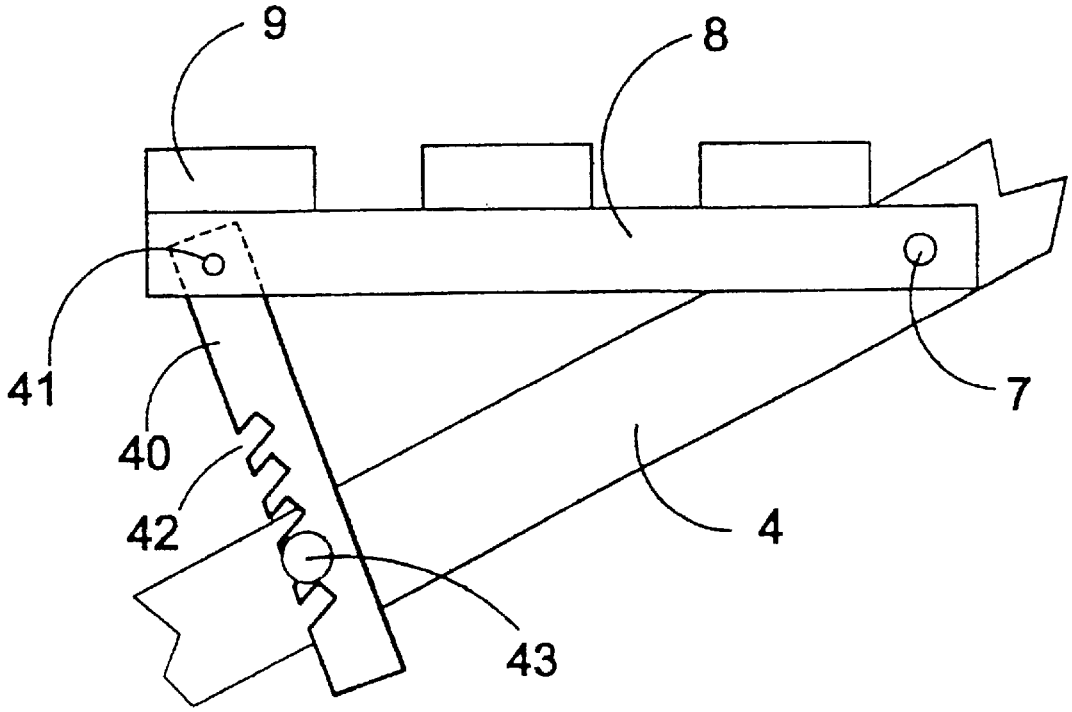
FIG. 3 shows a partial view of a discretely variable swing support of the present invention.

FIG. 3 shows a detailed view of a discretely variable swing support of the present invention. In FIG. 3 the side leg, 4, shelf pivot, 7, shelf arm, 8, and shelf cross-member, 9, are similar to those elements shown in FIGS. 1 and 2. The discretely variable swing support comprises a slotted swing arm, 40, pivotally attached to the side leg, 4, by an axle, 41. The slotted swing arm, 40, comprises a multiplicity of slots, 42, each of which are independently capable of engaging with a pin, 43. The slots, 42, are generally directed towards the shelf to insure that the pin is securely within the slot.

Figure 4:
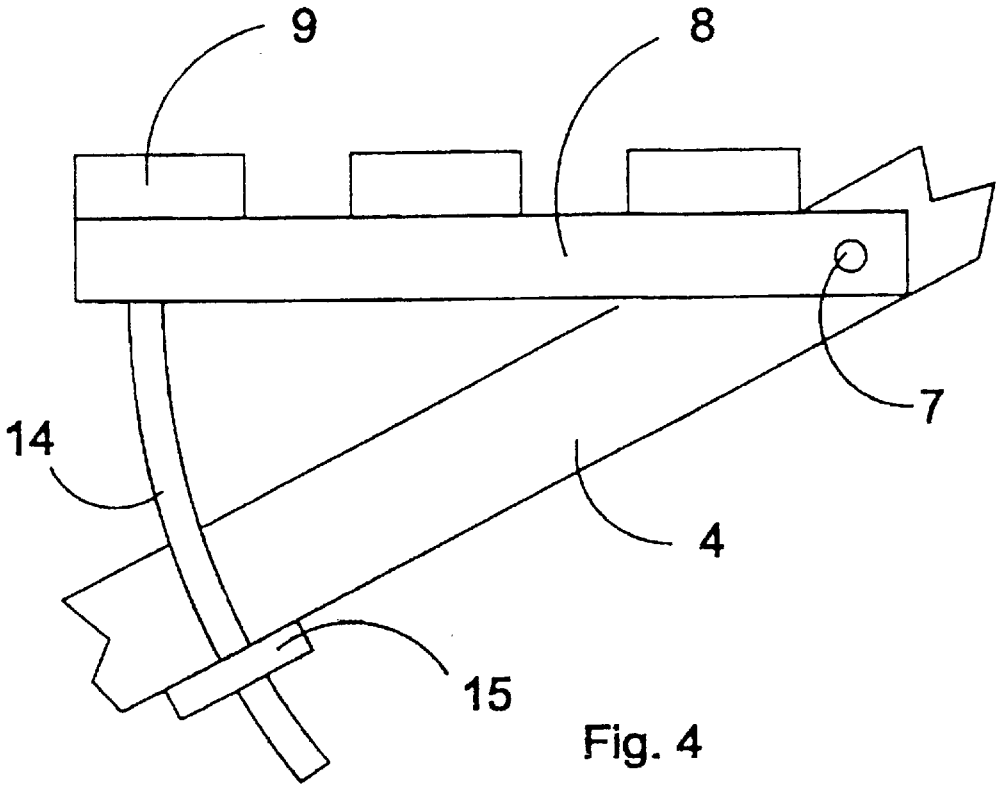
FIG. 4 shows a partial side view of a continuously variable swing support of the present invention.
Figure 5:
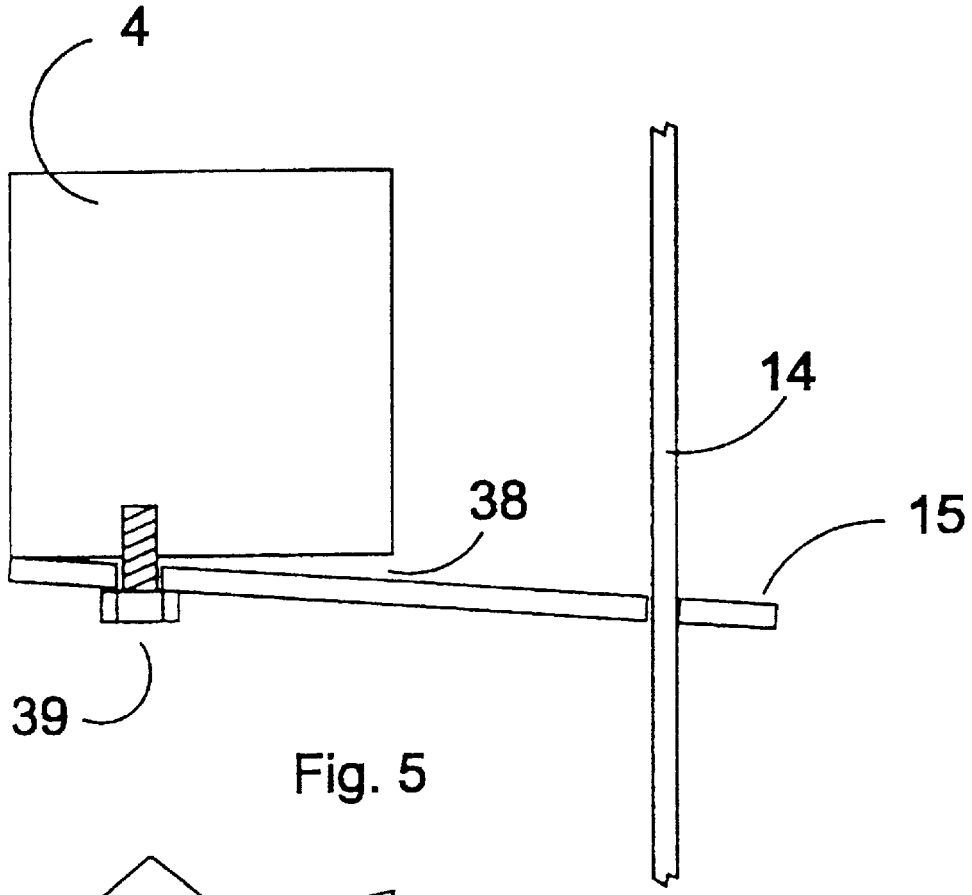
FIG. 5 shows a partial front view of a continuously variable swing support of the present invention.
Figure 6:
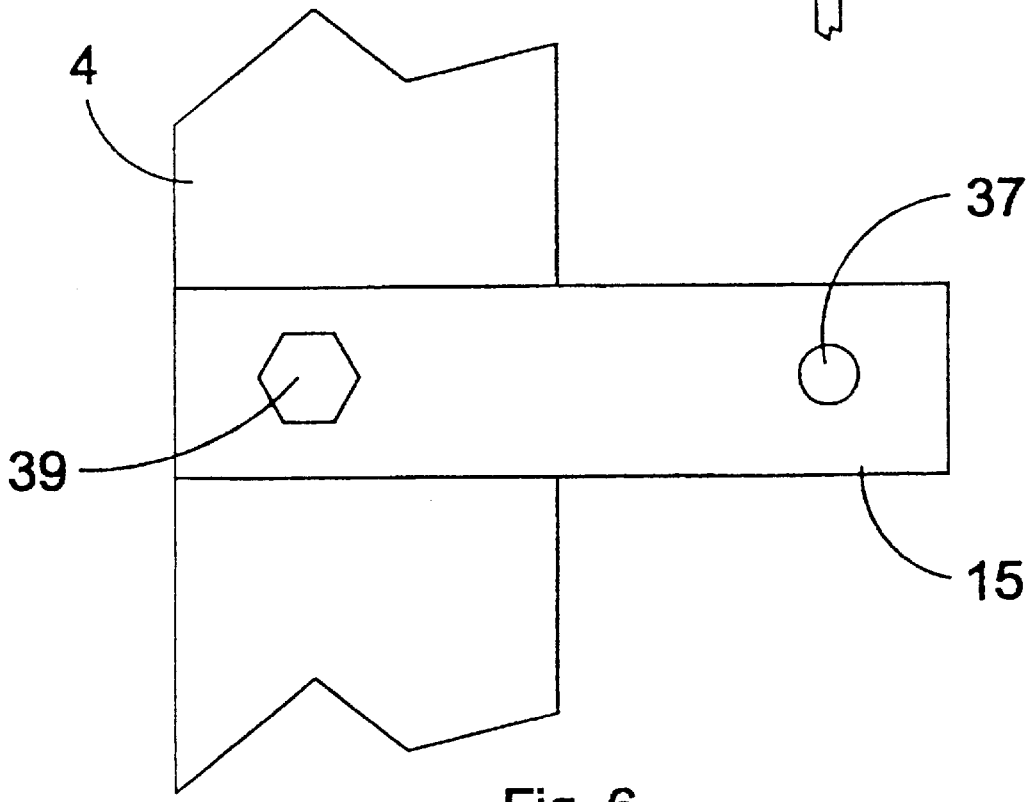
FIG. 6 shows a partial bottom view of a continuously variable swing support of the present invention.

FIGS. 4, 5 and 6 show different views of the mechanism for the continuously variable swing support of the present invention. FIG. 4 is a side view FIG. 5 is a frontal cutaway view and FIG. 6 is a bottom cutaway view. A tension bracket, 15, is attached to the bottom of the side leg, 4, with a bolt, 39. The bolt is inserted to insure that a gap, 38, is maintained between the side leg, 4, and the tension bracket, 15, as illustrated in FIG. 5. The continuously variable swing arm, 14, is inserted into a hole, 37, in the tension bracket, 15. The hole, 37, is just larger than the continuously variable swing arm, 14, and the same shape. When the shelf is lifted the continuously variable swing arm, 14, rises thereby removing any pressure from the tension bracket, 15. When the tension bracket is perpendicular to the continuously variable swing arm the continuously variable swing arm moves freely in the hole, 37. When the shelf is at rest the weight forces the tension bracket to bind the continuously variable swing arm within the hole, 37, thereby locking the tray in the orientation. As more weight is added to the tray the continuously variable swing arm is more tightly bound. The hole is preferably no more than ¼ of an inch in diameter larger than the continuously variable swing arm. More preferably the hole is no more than approximately ⅛ inch in diameter larger than the continuously variable swing arm.

Figure 7:
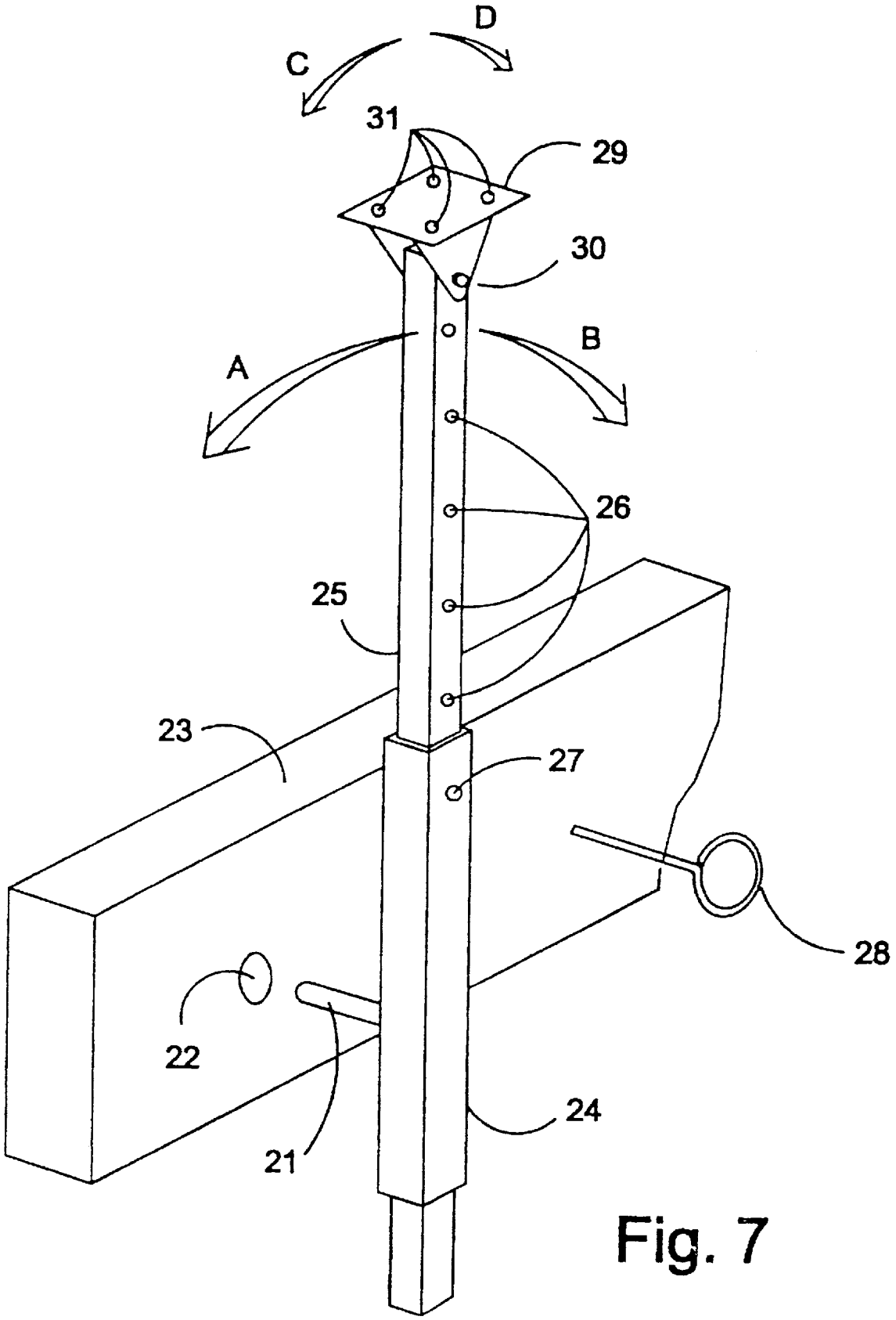
FIG. 7 shows an embodiment of the discretely adjustable support member of the present invention.

FIG. 7 shows one embodiment of a discretely adjustable support member of the present invention. The discretely adjustable support member comprises a finger, 21, suitable for mating with a substantially round void, 22, in a bottom frame member, 23. The bottom frame member is preferably either the side member, 2, of FIG. 1, or the brace, 13, of FIG. 1. Rigidly attached to the finger, 21, is a tube, 24, capable of accepting a discrete sliding member, 25, therein. The discrete sliding member, 25, comprises a multiplicity of adjustment holes, 26, each of which are capable of aligning with an alignment hole, 27, in the tube, 24. To change the length of the adjustable support member, a predetermined adjustment hole, 26, is aligned with the alignment hole, 27, and a pin, 28, is inserted through the pair of aligned holes. The upper extent of the discrete sliding member comprises a mounting bracket, 29, rotatably mounted to the discrete sliding member on an axle, 30. The mounting bracket, 29, preferably comprises a multiplicity of mounting holes, 31, for attachment to the side leg. One advantage offered with the present invention is the simplicity of operation and the rigidity of the adjustable support member. The adjustable support member can rotate on the axis defined by the finger, 21, as shown by the arrows A and B. The mounting bracket, 29, is also capable of rotating on the axis defined by the axle, 30, as shown by the arrows C and D. As the adjustable support member is lengthened the entire adjustable support member rotates on the axis defined by the finger, 21, in the direction of arrow A and the mounting bracket, 29, rotates on the axis defined by the axle, 30, in the direction of arrow C. It would be apparent to one skilled in the art that this allows the entire bin to be raised and lowered with minimal manipulation since the only part of the adjustable support member which must be manipulated is the pin, 28.

Figure 8:
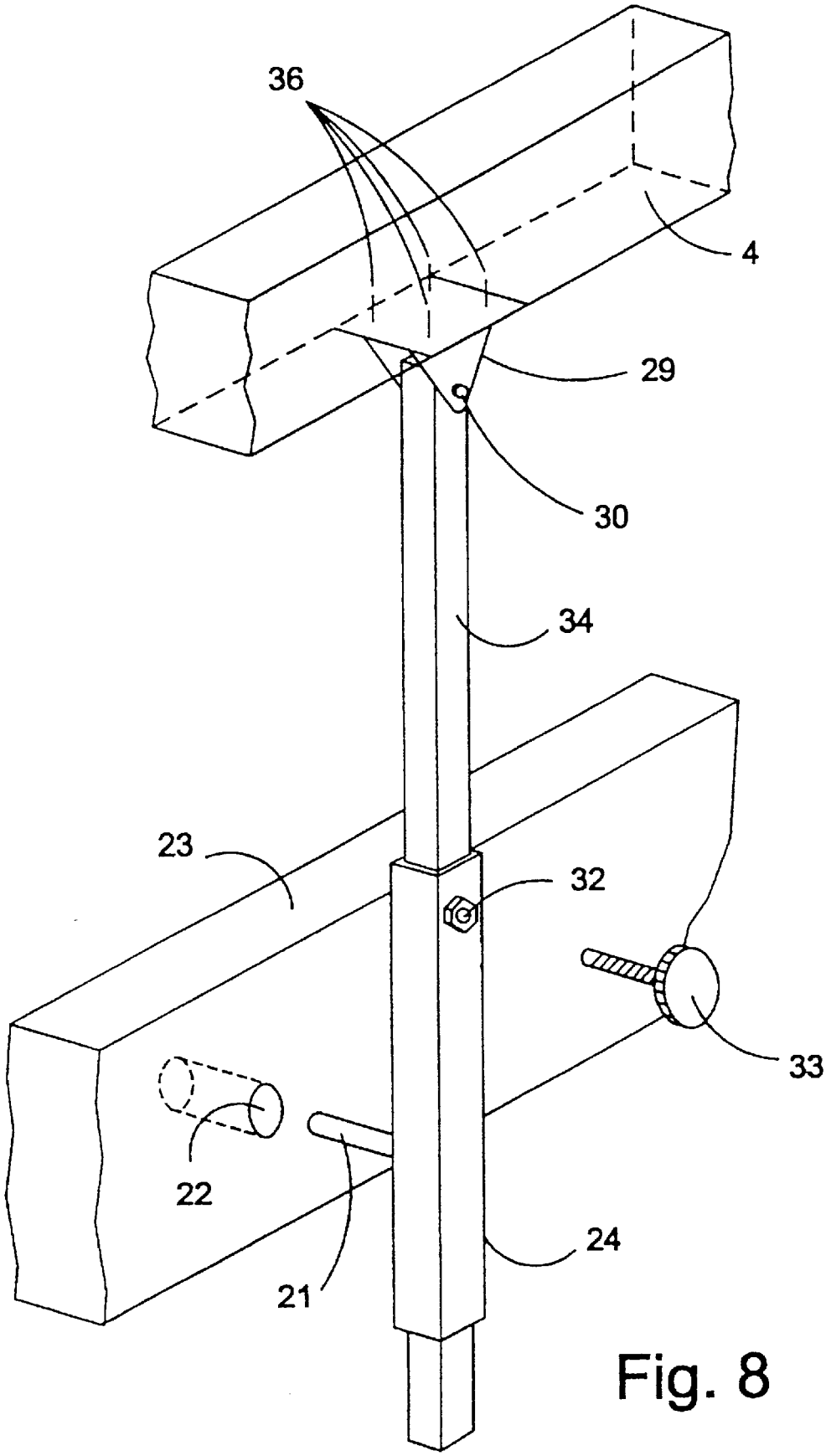
FIG. 8 shows an embodiment of the continuously variable support member of the present invention.

FIG. 8 shows an embodiment of a continuously adjustable support member. In FIG. 8 the finger, 21, void, 22, bottom frame member, 23, tube, 24, mounting bracket, 29 and axle, 30, are similar to the similarly numbered elements in FIG. 7. The tube, 24, comprises a threaded hole, 32. A similarly threaded pin, 33, mates with the threaded hole to abut against the continuously adjustable sliding member, 34, and retain the continuously adjustable sliding member in place. The length of the adjustable support member can be altered by twisting the threaded pin, 33, until it sufficiently disengages with the continuously adjustable sliding member to allow free movement of the continuously adjustable member within the tube. The continuously adjustable sliding member is then moved to the desired position in the tube, the threaded pin is then twisted to abut against the continuously adjustable sliding member. The mounting bracket, 29, is secured to the side member, 4, by attachment means, 36, such as glue, screws, nails, bolts and the like.

The length of the cross-member is preferably longer than the distance between the outer edges of the side arms. It is most preferred that the cross-members are of sufficient length to rest on the side members when the side members and side legs are parallel.

The overall shape of the produce table is preferably rectangular or square. Other shapes are considered within the teachings of the present invention including triangular, semicircular, or multifaceted such as expected from half of a hexagon, octagon or the like. The bottom frame and display frame may be of substantially the same shape or they may be of a different shape. Limitations on the combinations of shapes available would be apparent to one skilled in the art yet the constraints to be considered are limited to those combinations which allow for a pivotal attachment at the front and a suitable mounting position for the adjustable support member in the rearward portion of the produce stand.

The bottom frame is preferably a rectangle, or square, as illustrated in the drawings. Also considered within the teachings of the present invention are frames which are shaped substantially like the letter "H". While four sides are preferred it is considered within the teachings to employ a three sided frame and in fact this may be so preferred if weight is a concern for the intended application. The bottom frame members may be constructed from wood, metal, plastic, hardened resin, graphite and the like and the members may be secured one to the other in any conventional method including, nails, screws, bolts, glue, weld, rivet, framing brackets, or by common joining techniques such as rabbet joints, tongue-and-groove joints and the like, as known in the art.

The shelves are preferably rectangular or square, as described above, yet other shapes are considered within the teachings of the present invention.

It is preferable, but not necessary, for the produce stand to have a multiplicity of legs. It is most preferable that the length of the legs be adjustable as known in the art and it is most preferred that the legs have wheels in which the rotation of the wheels are capable of being locked and released as known in the art.

The finger may be unthreaded or threaded and preferably extends through the bottom frame member. To insure that the finger does not become dislodged from the bottom frame member a keeper is preferred such as a "C" shaped spring in a slot of the finger, a cotter pin, a threaded nut and the like.

Axles are defined as a pivot joint as well known in the art. The axle may comprise a rod inserted through aligned holes in the two pieces which are pivotally connected. Each end of the rod may comprise a keeper such as a cotter pin, "C"-shaped keeper, threaded nut and the like. Other types of axle joints are well known in the art.

The tube may be substantially square, substantially round or any other shape commonly employed for tubes. It is most preferred that the tube and sliding member are substantially of the same shape.

The sliding member may slide on the inside of the tube, as illustrated in the drawings, or it may slide on the outside of the tube. If the sliding member slides on the outside of the tube it is most preferable that the cross-section of the sliding member be shaped substantially like the letter "C" to allow the finger to traverse the open side of the sliding member. It would be apparent to one skilled in the art that the tube may be solid when the sliding member is exterior thereto and that the sliding member may be solid when the tube is exterior thereto. The holes in the sliding member and tube preferably align at various increments and the inserted pin maintains the alignment. The pin may go completely through the tube and sliding member or it may stop within the interior of the inner member.

A threaded pin may be employed with, or without, associated holes in the sliding member. When the sliding member is exterior to the tube the threaded hole may be integral to the sliding member.

Drawer brackets are well known in the art and many varieties are commercially available and suitable for the invention described herein. Most desirable is a drawer bracket which comprises a pair of tracks mounted to both the drawer and the frame wherein the tracks are capable of sliding one in the other.

I claim:

1. A rack for displaying merchandise comprising;

a bottom frame comprising;
- a front member;
- a pair of side members;

a display frame pivotally attached to said bottom frame wherein said display frame comprises;
- side legs;
- two parallel shelf arms pivotally attached to said side legs;
- at least one cross-member attached to each of said two shelf arms such that said shelf arms remain parallel;
- at least one swing support attached to each of said two shelf arms and said side legs;

at least one adjustable support rotatably mounted to said bottom frame and rigidly attached to said display frame wherein said adjustable support comprises;
- a tube;
- an elongated member slidably mounted to said tube;
- a locking element for reversibly fixing the position of said elongated member relative to said tube.

2. The rack of claim 1 wherein said swing support comprises a discretely adjustable swing arm.

3. The rack of claim 2 wherein said discretely adjustable swing support comprises;

a discretely adjustable swing arm pivotally attached to said shelf arm where said swing support comprises a multiplicity of slots;

a pin attached to said side leg wherein said pin is capable of engaging with said slot of said discretely adjustable swing arm.

4. The rack of claim 1 wherein said elongated member comprises a multiplicity of adjustment holes and said tube comprises an alignment hole capable of aligning with said adjustment holes of said elongated member.

5. The rack of claim 1 wherein said swing support comprises a continuously adjustable swing arm.

6. The rack of claim 5 wherein said swing support comprises;

a continuously variable swing support;

a tension bracket comprising a hole for receiving said continuously variable swing support mounted to said side leg wherein said hole, allows said continuously variable swing support to move freely when said tension bracket and said continuously variable swing support are parallel and binds said continuously variable swing support when said continuously variable swing support and said tension bracket are not parallel.

7. The rack of claim 1 wherein said tube comprises a threaded hole and said locking element consists of a threaded pin.

8. The rack of claim 1 wherein said at least one cross-member is of sufficient length to rest on said side member when said side member and said side legs are parallel.

9. The rack of claim 1 further comprising legs attached to said bottom frame.

10. A rack for displaying merchandise comprising;

a bottom frame comprising;
a front member;
a pair of side members;

a display frame pivotally attached to said bottom frame wherein said display frame comprises;
side legs;
two shelf arms pivotally attached to said side legs;
at least one cross-member attached to each said shelf arm such that said shelf arms remain parallel;
at least one discretely variable swing support attached to at least one of said shelf arms and at least one of said side legs;

at least one discretely adjustable support rotatably mounted to said bottom frame and rigidly attached to said display frame wherein said adjustable support comprises;
a tube comprising an alignment hole;
an elongated member slidably mounted to said tube wherein said elongated member comprises a multiplicity of alignment holes;
a locking element for reversibly engaging with one said adjustment hole of said elongated member and said alignment hole of said tube.

11. The rack of claim 10 wherein said discretely variable swing support comprises;

a swing arm pivotally attached to said shelf arm where said swing arm comprises a multiplicity of slots;

a pin attached to said side leg wherein said pin is capable of engaging with one of said multiplicity of slots of said swing arm.

12. The rack of claim 10 further comprising legs attached to said bottom frame.

13. The rack of claim 12 further comprising wheels attached to said legs.

14. The rack of claim 10 further comprising an extension slidably attached to said front member.

15. A rack for displaying merchandise comprising;

a bottom frame comprising;
a front member;
a pair of side members;

a display frame pivotally attached to said bottom frame wherein said display frame comprises;
side legs;
two shelf arms pivotally attached to said side legs;
at least one cross-member attached to each said shelf arm such that said shelf arms remain parallel;
at least one continuously variable swing support attached to one of said shelf arms and one of said side legs;

at least one adjustable support rotatably mounted to said bottom frame and rigidly attached to said display frame wherein said adjustable support comprises;
a tube;
an elongated member slidably mounted to said tube;
a locking element for reversibly fixing the position of said elongated member relative to said tube.

16. The rack of claim 15 wherein said swing support comprises a continuously adjustable swing arm.

17. The rack of claim 16 wherein said swing support comprises;

a continuously variable swing support;

a tension bracket comprising a hole for receiving said continuously variable swing support mounted to said side leg wherein said hole allows said continuously variable swing support to move freely when said tension bracket and said continuously variable swing support are parallel and binds said continuously variable swing support when said continuously variable swing support and said tension bracket are not parallel.

*18. A rack for displaying merchandise comprising;*

*a bottom frame comprising;*
*a front member;*
*a pair of side members;*

*a display frame pivotally attached to said bottom frame wherein said display frame comprises;*
*side legs;*
*at least one shelf; said shelf having two parallel shelf arms pivotally attached to said side legs;*
*at least one cross-member attached to each of said two shelf arms such that said shelf arms remain parallel;*
*at least one swing support attached to said shelf and said side legs;*

*at least one adjustable support attached to said bottom frame and to said display frame; said adjustable support includes an elongated member; said elongated member being movable wherein the position of said display frame may be changed relative to said bottom frame;*

*a locking element for reversibly fixing the position of said display frame relative to said bottom frame.*

* * * * *